No. 790,693. PATENTED MAY 23, 1905.
J. W. LEDOUX.
LIQUID METER.
APPLICATION FILED JUNE 2, 1904.
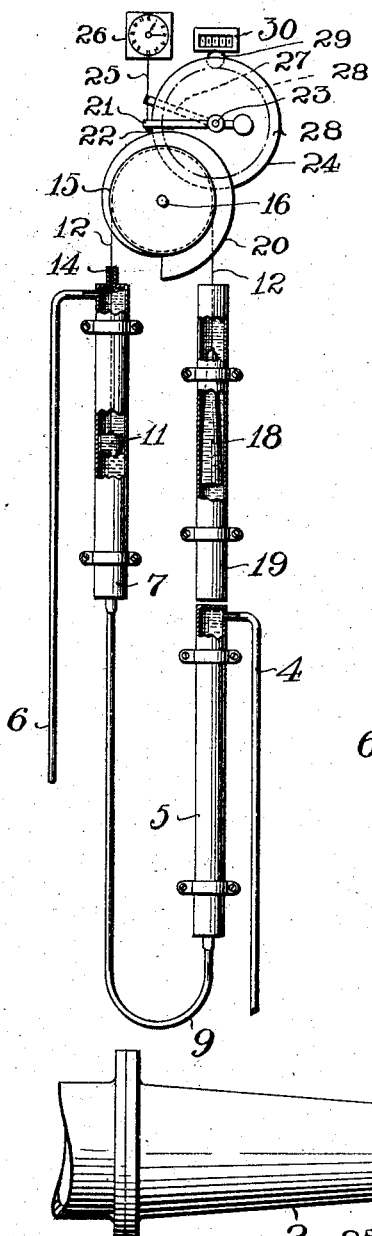
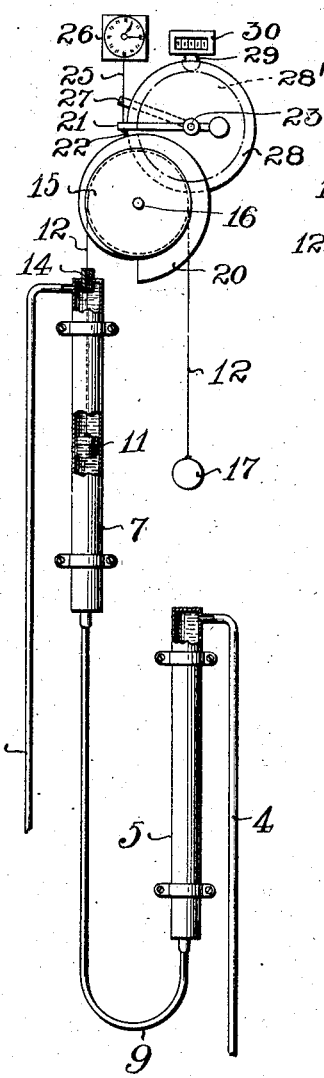
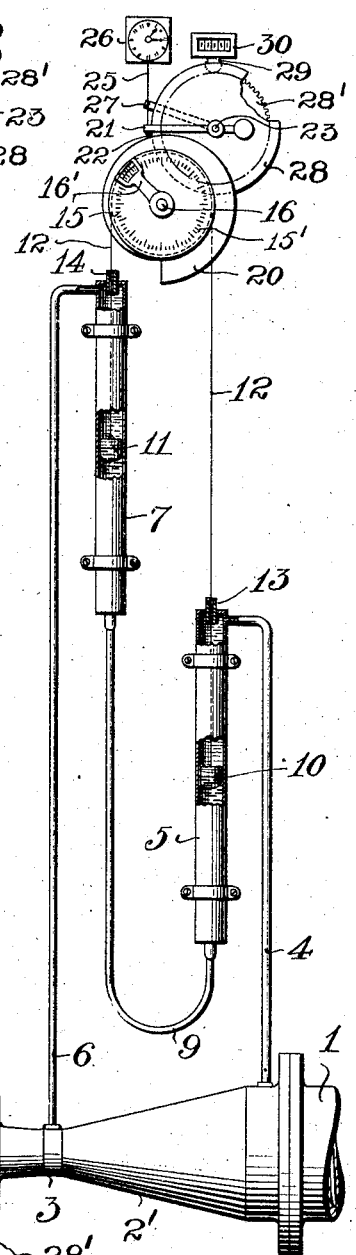
WITNESSES:
INVENTOR
John W. Ledoux
BY
Chas. N. Butler
ATTORNEY.

No. 790,693.         Patented May 23, 1905.

UNITED STATES PATENT OFFICE.

JOHN W. LEDOUX, OF SWARTHMORE, PENNSYLVANIA.

LIQUID-METER.

SPECIFICATION forming part of Letters Patent No. 790,693, dated May 23, 1905.

Application filed June 2, 1904. Serial No. 210,810.

*To all whom it may concern:*

Be it known that I, JOHN W. LEDOUX, a citizen of the United States, residing at Swarthmore, in the county of Delaware and State of Pennsylvania, have invented certain Improvements in Liquid-Meters, of which the following is a specification.

This invention relates to mechanism for measuring liquids flowing through conduits; and its leading object is to provide a simplified apparatus that will measure accurately the quantity of liquid flowing at any velocity from a state of rest to a maximum.

A further object is to show the rate of flow at any instant.

In improvements heretofore made by me facility is afforded for overcoming the inaccuracy usual in measuring liquids flowing through conduits at a low velocity.

The present improvements are designed to provide simplified mechanism for accurately showing the rate and measuring the quantity flowing regardless of the velocity.

In the accompanying drawings, Figure 1 is a diagrammatic view representing the invention. Fig. 2 is a view showing a modification in the form of the invention. Fig. 3 is a view showing a second modification in the form of the invention, and Fig. 4 represents a view of part of the register-actuating mechanism.

In the preferred form of the improvements there is used a conduit having the normal section 1 and the contracting sections 2 and 2' joined by the throat 3. The normal section is connected by a tube 4 with the top of a stationary chamber 5, and the throat of the contracted sections is connected by a tube 6 with the top of a stationary chamber 7. The tops of the chambers are closed, and the bottoms are connected by the tube 9, forming a reservoir containing mercury whose height in its respective branches varies with the pressures communicated thereto through the pipes 4 and 6.

As shown in Fig. 1, the chamber 7 contains a float 11 and the chamber 5 contains a counterbalancing weight or float 10. The two floats are connected, preferably, by a fine wire 12, which plays through small openings therefor in the plugs 13 and 14 in the tops of the respective chambers and passes over the balance-wheel 15, movable on the supporting-arbor 16.

As shown in Fig. 2, the float 11 in the chamber 7 is counterbalanced by suspending a weight 17, attached to the wire connected therewith and passing through the plug 14 and over the wheel 15, the wheel providing means exterior to the reservoir for balancing the float.

As shown in Fig. 3, the float 11 in the chamber 7 is counterbalanced by passing the wire 12, connected therewith, through the plug 14 and over the wheel 15 to a weight or float 18 of variable cross-section movable in fluid contained in a vessel 19.

As the wire operating the balance-wheel is of fine character, the aperture required for its passage through the top or tops of the reservoir is of very small size, and the clearance between the wire and walls of the aperture is so small as to be capillary in its action, so that no appreciable amount of water can escape.

The arbor 16, on which the wheel 15 turns, has fixed thereto a stationary pointer 16', past which the graduations 15' of the wheel 15 move as the float 11 is moved by variations of pressure communicated to the mercury from the conduit by the connecting-tubes according to a well-known law, and by the position of the float, as shown by the graduations of the wheel, the rate of flow at any given instant is indicated.

A cam 20 is fixed in relation to and revolves with the wheel 15. In the constructions shown in Figs. 1 and 2 the cam is formed in correspondence with the variations in the resultant pressure exerted upon the mercury in the reservoir due to the variations in pressure at the conduit-sections 4 and 6. In the construction shown in Fig. 3 as the weight 18 floats or dips in a fluid contained in its vessel it exerts a variable force upon the float 11, depending upon the shape of the floating weight 18 and its degree of submergence. The form of the cam will be varied as required by the form of the floating weight, of variable cross-section, and will have a simplified form, rendering the part used in measuring the flow at the lower velocities of flatter character.

The cam limits the downward movement of a lever 21, having a tappet 22, adapted for making contact with the periphery of the cam, and an arbor 23, on which it oscillates. The lever, which falls by gravity, is lifted by a ball or weight 24 engaging therewith and connected with a cord 25, movable freely through an aperture 21' in the lever, the ball and cord being lifted by a clock mechanism, as 26, and falling by gravity. The lever carries a rolling clutch mechanism 21'', adapted for gripping the periphery of the disk 28 (having the arbor 23) on the upward stroke and moving freely thereon on the downward stroke, the disk being held against retraction by a stationary lever 27, having the rolling clutch mechanism 27', engaging the periphery of the disk. Fixed in relation to and revoluble with the disk 28 is a spur-wheel 28', engaging a pinion 29, operating an indicating device, as a registering mechanism 30.

As the arc of the regularly-oscillating lever 21 is varied by the position of the cam 20, the rate of the registering mechanism 30 will be varied in accordance therewith, and as the position of the cam depends upon the position of the float 11 (which is regulated by the resultant or difference between the pressures at the normal and contracted sections of the conduit) the volume of water is integrated and registered.

Having described my invention, I claim—

1. In a liquid-meter, a conduit for conveying a liquid, a reservoir connected with said conduit for containing a liquid of greater density than the liquid conveyed by said conduit and receiving pressure from the latter, a float in said reservoir, means for balancing said float, and an integrating mechanism connected with and controlled by said balancing mechanism, substantially as specified.

2. In a liquid-meter, a reservoir substantially closed excepting an inlet near the top thereof, a float therein, means acting to balance said float, a cam connected with and operated by said float, and integrating mechanism connected with and controlled by said cam substantially as specified.

3. In a liquid-meter, a conduit, a reservoir connected with said conduit, a float in said reservoir, a balancing device connected with said float, a cam, mechanism whereby the movement of said balancing device moves said cam, and mechanism connected with said cam for indicating the quantity of water flowing in said conduit, substantially as specified.

4. In a liquid-meter, a conduit, a reservoir having branches connected with different sections of said conduit, a float in one of the branches of said reservoir, means for balancing said float, a cam connected with and operated by said balancing mechanism, and mechanism connected with said cam for indicating the flow in said conduit, substantially as specified.

5. In a liquid-meter, a mercury-reservoir comprising branches having a fluid connection, a conduit, tubes connecting a normal section and a contracted section of the conduit with the respective branches, a float in one of the branches, a rotary wheel, a cord supported by the wheel and connected with the float, and integrating mechanism connected with the wheel, substantially as specified.

6. In a liquid-meter, a reservoir, a float in said reservoir, mechanism comprising a wheel, a cord and a floating weight for counterbalancing said float, and an integrating mechanism controlled by said wheel, substantially as specified.

7. In a liquid-meter, a reservoir, a float in said reservoir, and counterbalancing mechanism for said float comprising a floating weight of variable cross-section, and a vessel containing a liquid into which said weight dips, substantially as specified.

8. In a liquid-meter, a substantially closed reservoir having a small opening in a branch thereof permitting a wire to play therethrough and preventing material leakage, a passage to said reservoir near the top thereof a float in said reservoir, a wire movable in said opening and connected with said float, counterbalancing mechanism connected with said wire, and registering mechanism operated thereby, substantially as specified.

9. In a liquid-meter, a mercury-reservoir having branches, a conduit connected with the respective branches of said reservoir, a float in one of said branches resting on the mercury therein, a slender device acting to balance said float, said device reciprocating in an opening in the top of said reservoir fitting said device so as to prevent the material escape of liquid therethrough and means coacting with said slender device for supporting and balancing said float, substantially as specified.

10. In a liquid-meter, a conduit, a reservoir connected with said conduit, said reservoir having branches adapted for holding fluid columns acting to support each other, a float in one of said branches, a slender device connected with said float and reciprocated thereby, said device reciprocating in an opening in said reservoir fitted thereto so as to prevent the material escape of liquid therethrough, a register, and mechanism whereby said slender device operates said register, substantially as specified.

In testimony whereof I have hereunto set my hand, this 31st day of May, 1904, in the presence of the subscribing witnesses.

JOHN W. LEDOUX.

In presence of—
THOMAS S. GATES,
UTLEY E. CRANE, Jr.